United States Patent [19]
Ohba

[11] Patent Number: 5,892,744
[45] Date of Patent: *Apr. 6, 1999

[54] OPTICAL DISK DRIVE TRACKING ERROR DETECTION UNIT

[75] Inventor: Akitomo Ohba, Tokyo, Japan

[73] Assignee: NEC Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 725,216

[22] Filed: Sep. 26, 1996

[30] Foreign Application Priority Data

Sep. 29, 1995 [JP] Japan ................................. 7-252884

[51] Int. Cl.$^6$ ............................................. G11B 7/09
[52] U.S. Cl. ..................................... 369/44.37; 369/44.41
[58] Field of Search ........................ 369/44.37, 44.38, 369/44.41, 44.26, 112, 44.14, 44.23

[56] References Cited

U.S. PATENT DOCUMENTS

| | | | |
|---|---|---|---|
| 5,113,378 | 5/1992 | Kimura | 369/44.37 |
| 5,123,003 | 6/1992 | Noda et al. | 369/44.37 |
| 5,138,592 | 8/1992 | Fujita | 369/44.37 |

FOREIGN PATENT DOCUMENTS

| | | |
|---|---|---|
| 0423364 | 4/1991 | European Pat. Off. . |
| 0536718 | 4/1993 | European Pat. Off. . |
| 0128830 | 1/1991 | Japan ................................. 369/44.37 |
| 5234107 | 9/1993 | Japan . |

OTHER PUBLICATIONS

"Optical Disk System" by Asakura–Shoten; date unknown; pp. 44–45.

*Primary Examiner*—Thang V. Tran
*Attorney, Agent, or Firm*—Hayes, Soloway, Hennessey, Grossman & Hage, PC

[57] ABSTRACT

A tracking error detecting unit outputs a tracking error signal for two types of optical disks having different recording densities. The tracking error detecting unit includes a diffraction grating for generating first- and second-order beams and a photodetector having detecting sections for receiving zero-, first- and second-order beams to generate reproduced signal, first pair of detected signals and a second pair of detected signals, respectively. The tracking error detecting unit outputs a difference between the first pair of detected signals in the case of a high density disk and outputs the difference between the second pair of detected signals in the case of an ordinary density disk to output a tracking error signal.

6 Claims, 5 Drawing Sheets

OPTICAL DISK DRIVE TRACKING ERROR DETECTION UNIT

BACKGROUND OF THE INVENTION (a) Field of the Invention

The present invention relates to a tracking error detecting unit and, more particularly, to a tracking error detecting unit for use in an optical disk drive for driving an optical disk file.

(b) Description of the Related Art

A conventional tracking error detecting unit in a head tracking system of an optical head will be described with reference to FIGS. 1 to 4. The detecting unit for an optical head uses three beams for obtaining a tracking error signal.

FIG. 1 shows a block diagram of the tracking error detecting unit 50. The tracking error detecting unit 50 includes a diffraction grating 51 for diffracting a beam emitted from a light source 101 of the head tracking system 100 to generate first-order diffracted beams, a refocusing lens 53 for refocusing reflected beams from a beam splitter 52, a photodetector 54 for receiving the reflected beams, which have been refocused through the refocusing lens 53, to output electric detected signals, and a tracking error calculating section 58 for calculating a tracking error signal based on the detected signals.

In the head tracking system 100 of FIG. 1, there is also provided a collimating lens 102 for collimating the beam emitted from the light source 101, and an objective lens 103 for focusing diffracted beams generated by the diffraction grating 51 onto an optical disk file 70.

FIG. 2 shows the beams focused on the optical disk file 70, and FIG. 3 shows the beams received by the photodetector 54. In FIG. 2, reference numeral 105 denotes a focused spot of a main beam, i.e. the zero-order diffracted beam, and reference numerals 106 and 107 denote focused spots of sub-beams, i.e., a pair of first-order diffracted beams, which are positioned slightly away from each other in the radial direction (P) of the disk file. Those beams pass through the objective lens 103 to refocus on the optical disk file to form optical spots.

The optical spots 105,106 and 107 are formed in the following manner. In FIG. 1, the beam emitted from the light source 101 passes through the diffraction grating 51 so that the beam is split into a zero-order diffracted beam and a pair of first-order diffracted beams. These beams are reflected by the optical disk file 70 and travel along their original paths, and then part of each beam is reflected by the beam splitter 52. The reflected beams pass through the refocusing lens 53 to focus on respective detecting sections 55, 56 and 57 of the photodetector 54, as shown in FIG. 3.

The photodetector 54 includes a plurality of detecting sections 55, 56, and 57 for receiving a zero-order diffracted beam and two first-order diffracted beams reflected from the optical disk file 70 to output electric detected signals. The two first-order diffracted beams 106 and 107 are located on both sides of the zero-order diffracted beam 105. Detected signals corresponding to the first-order diffracted beams 106 and 107 are input to the tracking error calculating section 58 of FIG. 1.

The reflected main beam 105 and the reflected subbeams 106 and 107 detected by the detecting sections 55, 56, and 57, generate output signals, i.e., detected signals. The detected signal S105 corresponding to the reflected main beam 105 is used for generating a reproduced signal and a focus error signal, and the detected signals S106 and S107 corresponding to the reflected sub-beams 106 and 107 are input to the tracking error calculating section 58.

The tracking error calculating section 58 is implemented by an electrical circuit, which calculates a tracking error signal based on the difference between the detected signals representing the first-order diffracted beams 106 and 107 in accordance with a program previously input, and which outputs the tracking error signal.

FIG. 2 illustrates the locational relationship between tracks of the optical disk file 70 and a plurality of the optical spots 105, 106 and 107 focused on the optical disk file 70. In this example, each track includes a land portion 71 on which data pits, for example, are formed, and a groove 72 which is used for tracking operation.

FIG. 4 shows waveforms of the detected signals S106 and S107 output from the photodetector 54 as functions of the radial direction of the disk file The tracking error calculating section 58 calculates the difference between the detected signals S106 and S107 to obtain a tracking error signal "G" based on the difference. The calculation of the tracking error signal "G" on the basis of the subbeams 106 and 107 is based on the principle described below.

A minimal point of the signal waveform of the subbeam 106 corresponds to a state in which the subbeam 106 is irradiated onto a land portion 71 of the disk file and in which the signal amplitude is minimized due to diffraction caused by the land portion 71. A maximal point of the signal waveform corresponds to a state in which the subbeam 106 is irradiated onto a groove 72 and in which the signal amplitude is maximized. Thus, both the distance between the minimal points and the distance between the maximal points correspond to the track pitch Tp.

Since the subbeam 107 is offset slightly from the subbeam 106 in the radial direction (P) of the optical disk file 70 in FIG. 2, the waveform of the detected signal S107 corresponding to the subbeam 107 shifts along the abscissa, i.e., radial direction from the waveform of the detected signal S106.

The amplitude of the tracking error signal "G" is maximized when the detected signals S106 and S107 are apart from each other along the abscissa by a half of the track pitch Tp, that is, when the distance between the subbeams S106 and S107 in the radial direction "P" of the optical disk file is half the track pitch Tp.

In view of the above, the pitch and rotational angle of the diffraction grating 51 are determined such that the main beam 105 is located at the midpoint between the subbeams 106 and 107 and such that each of the subbeams 106 and 107 is offset from the main beam 105 by a quarter (¼) of the track pitch Tp in the radial direction P of the optical disk file 70.

In a conventional optical disk file 70, such as a read-only compact disk or a rewritable magneto-optical disk, a track pitch is approximately 1.6 $\mu$m. According to the example mentioned above, since the distance between the main beam 105 and each of the subbeams 106 and 107 is set at 0.4 $\mu$m in the radial direction, the amplitude of a tracking error signal is maximized to facilitate the tracking operation.

In the conventional head tracking system, a beam is emitted from the light source 101 and is then passed through the collimating lens 102 to be converted into a parallel beam. The parallel beam is diffracted by the diffraction grating 51 such that at least a pair of first-order diffracted beams are generated. The diffracted beams first pass through the beam splitter 52 and then through the objective lens 103, thereby focusing onto the optical disk file 70.

The main beam 105 and the subbeams 106 and 107 fall on and are reflected from the optical disk file 70. These reflected beams fall on the photodetector 54 via the objective lens 103, beam splitter 52, and refocusing lens 53, and are detected by the detecting sections 55, 56, and 57 of the photodetector 54. The detected signal S105 is output to another signal processing system of the optical disk drive and is processed therein as a reproduced signal or a focused error signal. The detected signals S106 and S107 are supplied to the tracking error calculating section 58, which generates the tracking error signal "G" based on the signals S106 and S107 and outputs the same to a control system of the optical disk drive. The control system controls the optical head in accordance with the tracking error signal "G" so as to perform the tracking operation.

There has recently been proposed an optical disk drive which uses a digital video disk (DVD), i.e., a high-density disk having a larger capacity, in addition to an ordinary disk such as a compact disk. Various types of high-density disks of this type are proposed, and their track pitches are approximately 0.8 μm, about half that of the ordinary disk.

In a conventional head tracking system, the locations of the three beams is adjusted beforehand by a diffraction grating so as to optimize the distance between the beams for the track pitch of an ordinary disk. As a result, when a high-density disk is used which has a track pitch about half that of the ordinary disk, a satisfactory tracking error signal cannot be obtained.

In this case, the diffraction grating may be adjusted again in order to obtain an optimum tracking error signal. However, the adjustment hinders users from operating the disk drive for the ordinary disk.

SUMMARY OF THE INVENTION

In view of the foregoing, it is an object of the present invention to provide a tracking error detecting unit capable of adequately detecting a tracking error signal for each of two types of optical disks having different recording densities.

The present invention is directed to a tracking error detecting unit for use in an optical disk drive comprising a diffraction grating for diffracting a beam to generate at least a pair of first-order diffracted beams and a pair of second-order diffracted beams, a first optical system for irradiating the diffracted beams onto an optical disk, a second optical system for passing the diffracted beams reflected by the optical disk, a photodetector, having a pair of first detecting section and a pair of second detecting section for receiving the pair of first-order diffracted beams and pair of second-order diffracted beams, respectively, for generating a pair of first detected signals and a pair of second detected signals, a calculating section for calculating a first difference between the pair of first detected signals and a second difference between the pair of second detected signals.

In the structure as described above, when the optical disk file is an ordinary disk, the tracking error calculating section outputs the second tracking error signal obtained from the second-order diffracted beams. In this case, the second tracking error signal assumes a maximum amplitude in the ordinal disk.

When the optical disk file is a high-density disk, whose track pitch is about half that of an ordinary disk, the tracking error calculating section outputs the first tracking error signal obtained from the first-order diffracted beams. The first tracking error signal assumes a maximum amplitude in the high density disk.

In the present invention, a beam emitted toward an optical disk file is diffracted to generate at least first- and second-order beams, the diffracted beams reflected from the optical disk file are detected by respective detecting sections of the photodetector, and tracking error signals are calculated based on both the first-order and second-order diffracted beams. Accordingly, for both of an ordinary optical disk and a high-density optical disk having a track pitch about half that of the ordinary disk, a tracking error can be detected using a corresponding tracking error signal with its amplitude being maximized.

Thus, by providing the tracking error detecting unit of the present invention to an optical disk drive, a suitable tracking operation can be performed for two types of optical disks having different recording densities, whereby an easy handling of the optical disk drive can be obtained.

The above and other objects, features and advantages of the present invention will be more apparent from the following description.

DESCRIPTION OF THE PREFERRED EMBODIMENTS

Figure 1:
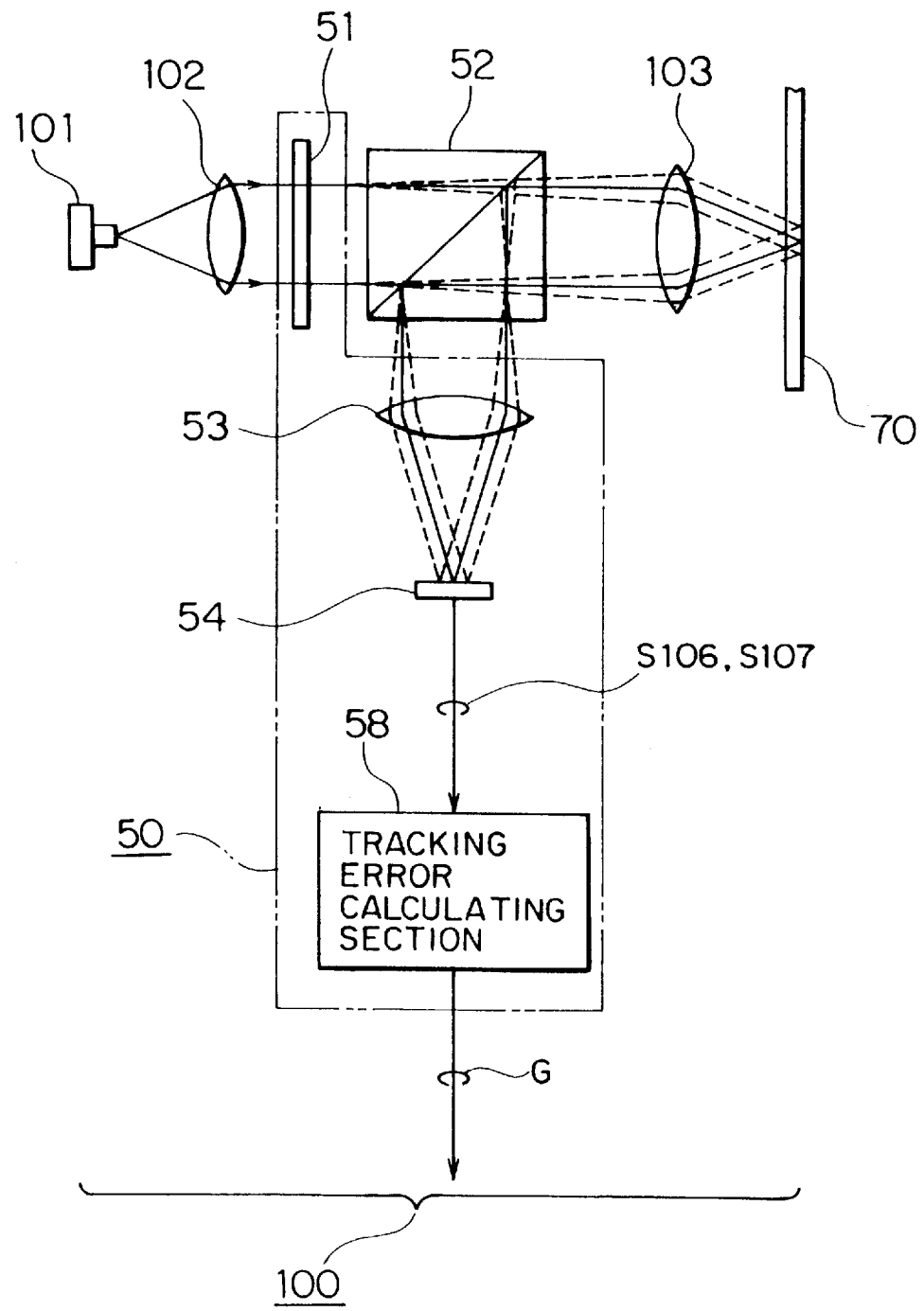
FIG. 1 is a block diagram of an optical system in a conventional head tracking system.
Figure 2:
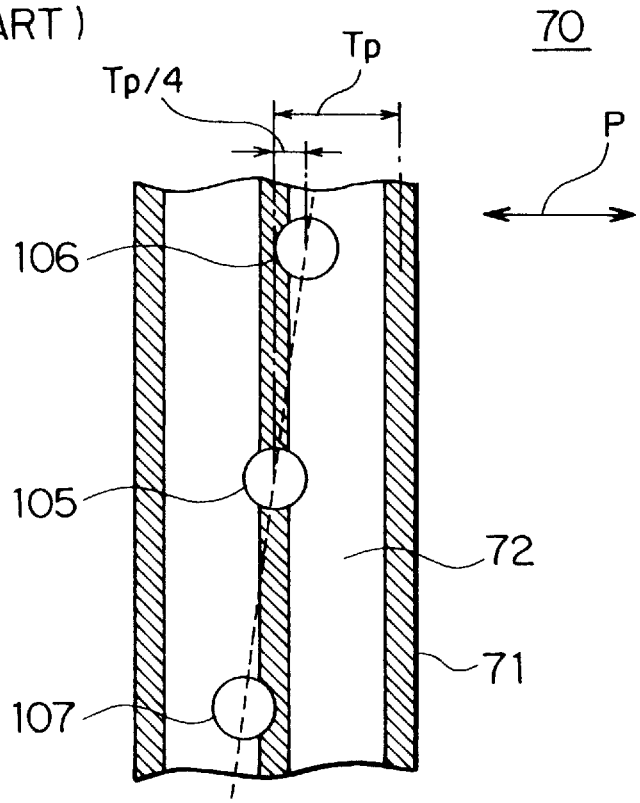
FIG. 2 is a schematic diagram illustrating diffracted beams focused on the optical disk file shown in FIG. 1.
Figure 3:
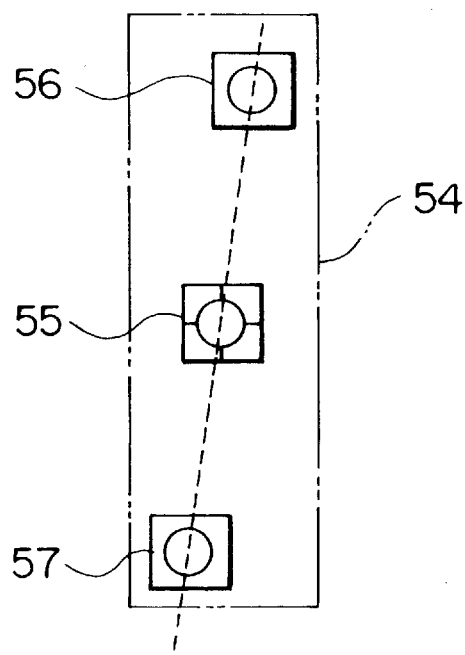
FIG. 3 is a schematic diagram illustrating reflected beams focused on the photodetector shown in FIG. 1.
Figure 4:
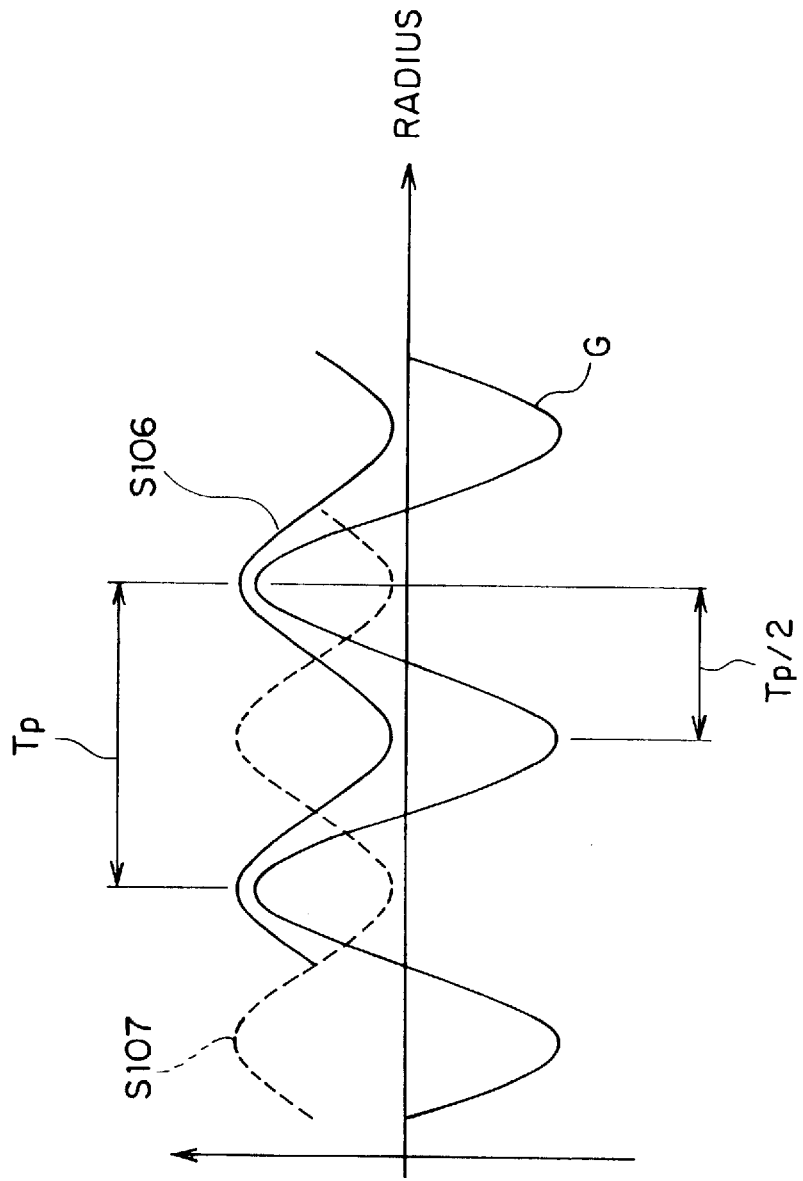
FIG. 4 is a graph illustrating the relationship between the amplitude of a tracking error signal and the phase difference between detected signals derived from a pair of first-order diffracted beams.
Figure 5:
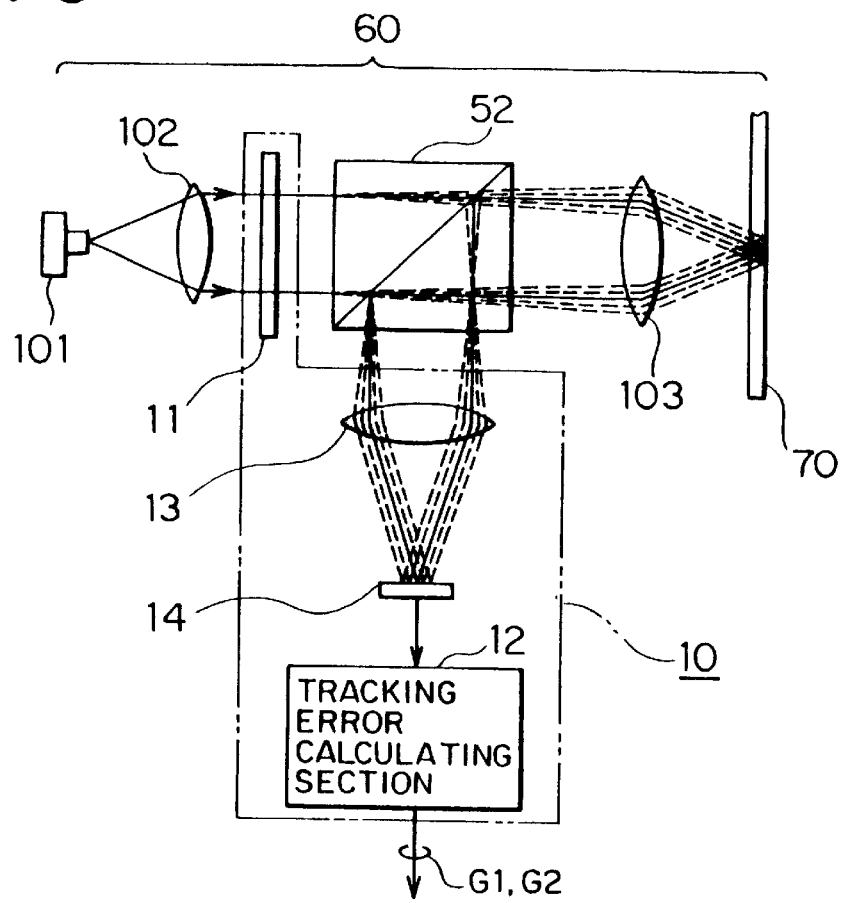
FIG. 5 is a block diagram of a head tracking system including a tracking error detecting unit according to an embodiment of the present invention.
Figure 6:
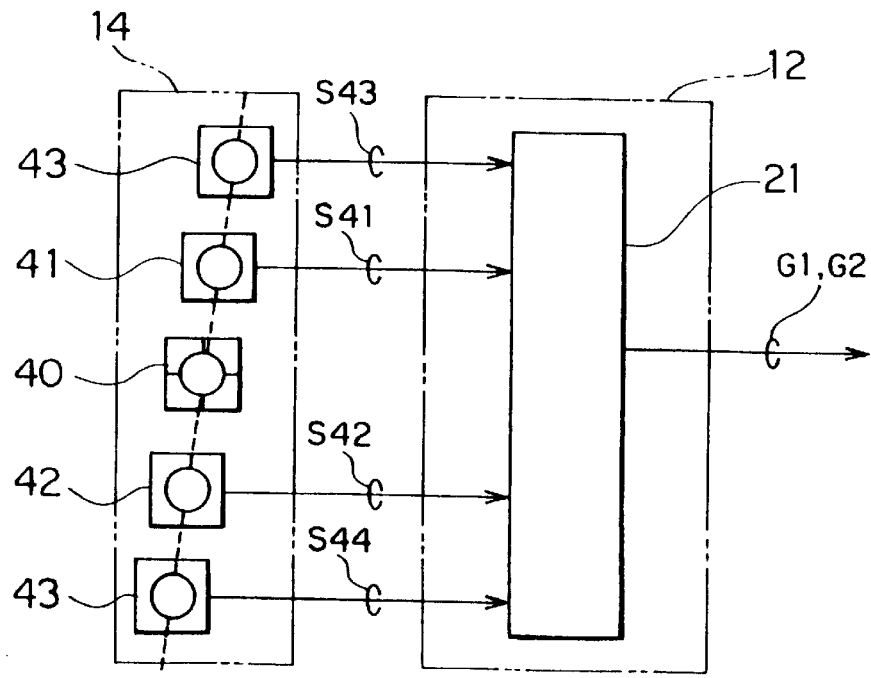
FIG. 6 is a block diagram of a part of the tracking error calculating section shown in FIG. 5.

An embodiment of the present invention will now be described. Referring first to FIG. 5, the head tracking system 60 includes a tracking error detecting unit 10 according to the embodiment. The head tracking system 60 is used in an optical disk drive for driving an ordinary disk file as well as a high density disk file.

The head tracking system 60 includes a light source 101 which emits a beam toward an optical disk file 70, a collimating lens 102 for collimating the beam into a parallel beam, an objective lens 103 for focusing the parallel beam onto the optical disk file 70, a beam splitter 52 for reflecting toward a refocusing lens 13 part of reflected beams from the optical disk file 70, and the tracking error detecting unit 10.

The tracking error detecting unit 10 includes a diffraction grating 11 for diffracting the parallel beam from the collimating lens 102 into first- and second-order diffracted beams, the refocusing lens 13 for refocusing diffracted beams reflecting from the optical disk file 70, a photodetector 14 for receiving the refocused beam to output detected electric signals, and a tracking error calculating section 12 for outputting a tracking error signal generated on the basis of the detected signals.

The diffraction grating 11 has a periodical structure arranged at a constant pitch on a plane. The orientation and pitch of arrangement of the zero-, first- and second-order beams on the optical disk file 70 are controlled by adjusting the pitch of the slits in the diffraction grating 11 and by rotating the diffraction grating 11 about an axis perpendicular to the plane of the diffraction grating 11.

Figure 7:
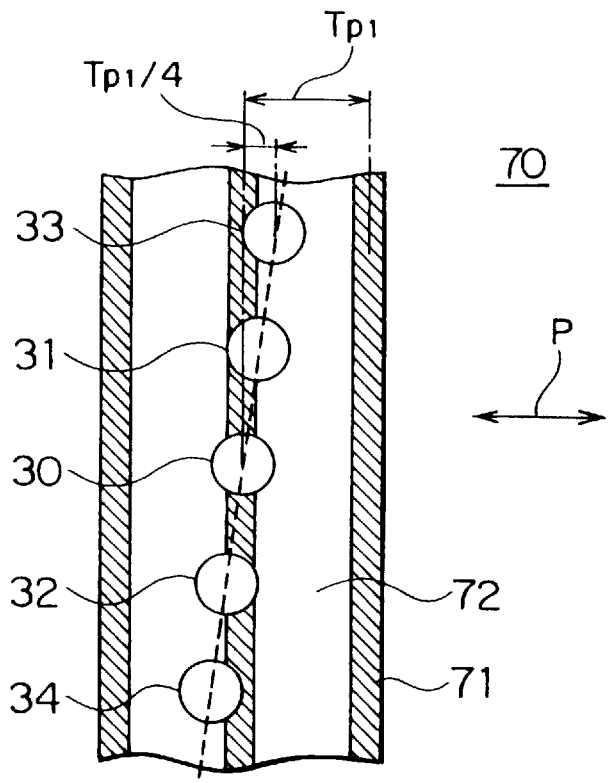
FIG. 7 is a schematic diagram illustrating diffracted beams focused on an ordinary optical disk file.
Figure 8:
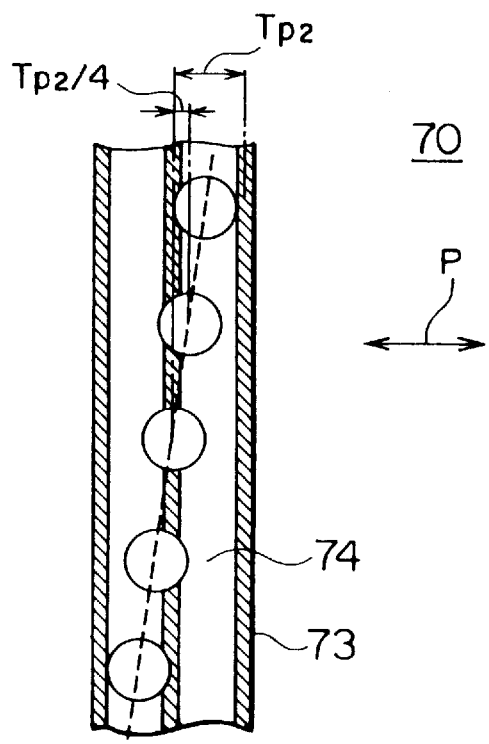
FIG. 8 is a schematic diagram illustrating diffracted beams focused on a high-density optical disk.

The tracking error detecting unit 10 of the present embodiment can be used for an ordinary disk in which tracks are arranged at an ordinary pitch $T_{p1}$ as shown in FIG. 7, and a high-density disk in which tracks are arranged at a track pitch $T_{p2}$, which is about half the track pitch $T_{p1}$, as shown in FIG. 8.

The diffraction grating 11 can be adjusted in FIG. 7 such that the distance between the zero-order diffracted beam and either one of the second-order diffracted beams is Tp¼ in the radial direction P of the optical disk file 70, and adjusted in FIG. 8 such that the distance between the zero-order diffracted beam and either one of the first-order diffracted beams is Tp²⁄₄ in the radial direction P of the optical disk file 70.

The zero-, first- and second-order diffracted beams generated by the diffraction grating 11 are irradiated onto the optical disk file 70 in a row having a predetermined inclination with respect to the tracks of the disk file 70. That is, as shown in FIG. 7, the diffracted beams are aligned in a row and in the following order, from top to bottom in FIG. 7: one of a pair of second-order diffracted beams 33, one of a pair of first-order diffracted beams 31, a zero-order diffracted beam 30, the other of the pair of first-order diffracted beams 32, and the other of the pair of second-order diffracted beams 34. These diffracted beams reflected from the optical disk file 70 pass through the objective lens 103 and then enter the beam splitter 52, which reflects part of each of the reflected diffracted beams toward the refocusing lens 13.

Each of the reflected diffracted beams is focused, by the refocusing lens system 13, on the photodetector 14. The photodetector 14 includes a pair of first detecting sections 41 and 42, a pair of second detecting sections 43 and 44, and a single third detecting section 40. The first detecting sections 41 and 42 receive the reflected, first-order diffracted beams 31 and 32 to output detected signals S41 and S42, respectively. The second receiving sections 43 and 44 receive the reflected, second-order diffracted beams 33 and 34 to output detected signals S43 and S44, respectively. The third receiving section 40 receives the reflected, zero-order diffracted beam 30 to output a detected signals S40.

The detected signal output from the detecting section 40 is input to another signal processing section of the optical disk drive and processed therein to generate a reproduced signal and a focus error signal. The detected signals S41, S42, S43, and S44 output from the respective detecting sections 41, 42, 43, and 44 are input to the tracking error calculating section 12 as shown in FIG. 5.

The tracking error calculating section 12 is implemented by an electrical circuit. The electrical circuit outputs first and second tracking error signals G1 and G2. Specifically, the first tracking error signal G1 is calculated from the difference between the detected signals S41 and S42 corresponding to the reflected first-order diffracted beams. The second tracking error signal G2 is calculated from the difference between the detected signals S43 and S44 corresponding to the reflected second-order diffracted beams. Thus, the tracking error calculating section 12 can output a tracking error signal corresponding to the type of the disk in use.

The tracking error signal G1 or G2 as described above is output to a control system of the optical disk drive. The control system controls the optical head in accordance with the tracking error signal G1 or G2 so as to perform a tracking operation.

In operation, a beam emitted from the light source 101 is passed through the collimating lens 102 to be collimated into a parallel beam. The parallel beam is diffracted by the diffraction grating 11 such that at least first-order diffracted beams and second-order diffracted beams are generated. The diffracted beams 30, 31, 32, 33, and 34 are focused through the objective lens 103 onto the optical disk file 70 as shown FIGS. 7 and 8. These diffracted beams are reflected from the optical disk file 70 and then enter the beam splitter 52, which splits each of the reflected diffracted beams by reflection. The thus-split reflected beams are refocused through the refocusing lens 13 onto the detecting sections 40, 41, 42, 43, and 44 of the photodetector 14.

The detected signal corresponding to the zero-order diffracted beam 30 and output from the detecting section 40 is input to another signal processing system of the optical disk drive and processed therein to generate a reproduced signal and a focus error signal. The detected signals S41 and S42 corresponding to the first-order diffracted beams 31 and 32 and output from the detecting sections 41 and 42 as well as the detected signals S43 and S44 corresponding to the second-order diffracted beams 33 and 34 and output from the detecting sections 43 and 44 are input to the tracking error calculating section 12.

The tracking error calculating section 12 calculates the first tracking error signal G1 based on the detected signals S41 and S42 and the second tracking error signal G2 based on the detected signals S43 and S44 and outputs the signals G1 and G2.

The tracking error signals G1 or G2 is output, for example, to a control system of an optical disk drive. The control system controls the optical head in accordance with the tracking error signals G1 or G2 so as to perform a tracking operation.

When the optical disk file 70 is an ordinary disk, the tracking error signal G2 is used, based on the difference between the detected signals S43 and S44 corresponding to the second-order diffracted beams. The pair of second-order diffracted beams are located on opposite sides about the zero-order diffracted beam. Also, the diffraction grating 11 is adjusted such that the distance in a radial direction of a disk file between the zero-order diffracted beam and each second-order diffracted beam is ¼ of the track pitch Tp of the disk file. Accordingly, a tracking error signal having a maximized amplitude can be obtained. That is, tracking operation can be performed effectively using the tracking error signal G2.

On the other hand, when the optical disk file 70 is a high-density disk, the tracking error signal G1 is used, based on the difference between the detected signals S41 and S42 corresponding to the first-order diffracted beams. The pair of first-order diffracted beams are located on opposite sides about the zero-order diffracted beam. Also, the diffraction grating 11 is controlled such that the distance in a radial direction of a disk file between the zero-order diffracted beam and each first-order diffracted beam is ¼ of the track pitch of the disk file. Accordingly, a tracking error signal having a maximized amplitude can be obtained. That is, tracking operation can be performed effectively using the tracking error signal G1.

When the diffraction grating 11 is adjusted such that the distance between the zero-order diffracted beam 30 and each of the first-order diffracted beams 31 and 32 is ¼ of the track pitch $T_{p2}$ of a high-density disk, the distance between the zero-order diffracted beam 30 and each of the second-order diffracted beams 33 and 34 is equal to ¼ of the track pitch $T_{p1}$ of an ordinary disk. Accordingly, a tracking error signal having a maximized amplitude can be obtained at the same time for the high density and ordinary disks.

An optical disk file used in the embodiments described above may be any optical medium, for example, a phase-change optical disk or a magneto-optical disk.

Although the invention is described with reference to the preferred embodiment thereof, the invention is not limited thereto and various modifications or alterations can be easily made without departing from the gist of the invention.

What is claimed is:

1. A tracking error detecting unit of use in an optical disk drive comprising a single diffraction grating for diffracting a beam to generate at least a pair of first-order diffracted beams and a pair of second-order diffracted beams, said first- and second-order beams being irradiated onto said optical disk in a row and having a predetermined inclination with respect to a track of said disk, said diffraction grating having a periodic structure, said diffracted beams being controlled by adjusting a pitch of said structure and by rotating said diffraction grating about an axis perpendicular to a plane thereof, a first optical system for irradiating said diffracted beams onto an optical disk, a second optical system for passing said diffracted beams reflected by the optical disk, a photodetector having a pair of first detecting sections and a pair of second detecting sections for receiving said pair of first-order diffracted beams and pair of second-order diffracted beams, respectively, for generating a pair of first detected signal and a pair of second detected signals, a calculating section for calculating a first difference between said pair of first detected signals and a second difference between said pair of second detected signals and outputting a tracking error signal.

2. A tracking error detecting unit as defined in claim 1, and further comprising a zero-order diffracted beam, wherein the distance between said zero-order diffracted beam and each of pair of said first-order diffracted beams is equal to a quarter of a track pitch of the high density optical disk file.

3. A tracking error detecting unit as claimed in claim 2, wherein said second-order detracted beams, respectively, are located at positions which are spaced apart from said zero-order defracted beam by a distance equal to twice the distance between the first-order defracted beams, respectively, and said zero-order defracted beam.

4. A tracking error detecting unit as defined in claim 1, and further comprising a zero-order diffracted beam, wherein the distance between said zero-order diffracted beam and each of pair of said second-order diffracted beams is equal to a quarter of a track pitch of the ordinary density optical disk file.

5. A tracking error detection unit as claimed in claim 4, wherein said second-order detracted beams, respectively, are located at positions which are spaced apart from said zero-order defracted beam by a distance equal to twice the distance between the first-order defracted beams, respectively, and said zero-order defracted beam.

6. A tracking error detection unit as claimed in claim 1, wherein said periodic structure comprises periodic slits.

\* \* \* \* \*